US012027825B1

(12) United States Patent
Prankl et al.

(10) Patent No.: US 12,027,825 B1
(45) Date of Patent: Jul. 2, 2024

(54) SPARK PLUG AND METHOD FOR PRODUCING A SPARK PLUG

(71) Applicant: INNIO Jenbacher GmbH & Co OG, Jenbach (AT)

(72) Inventors: Stefan Prankl, Weer (AT); Johann Klausner, St. Jakob i.H. (AT); Robert Grabner, Pogier (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/396,425

(22) Filed: Dec. 26, 2023

Related U.S. Application Data

(63) Continuation of application No. 17/639,337, filed as application No. PCT/AT2019/060344 on Oct. 15, 2019, now Pat. No. 11,855,417.

(51) Int. Cl.
*H01T 13/08* (2006.01)
*H01T 13/16* (2006.01)
*H01T 13/32* (2006.01)

(52) U.S. Cl.
CPC ............. *H01T 13/08* (2013.01); *H01T 13/16* (2013.01); *H01T 13/32* (2013.01)

(58) Field of Classification Search
CPC .......... H01T 13/08; H01T 13/16; H01T 13/32
USPC .......................................................... 313/118
See application file for complete search history.

(56) References Cited

U.S. PATENT DOCUMENTS

| | | | |
|---|---|---|---|
| 1,840,528 | A | 1/1932 | Rabezzana |
| 5,430,346 | A | 7/1995 | Johnson |
| 8,558,442 | B2 | 10/2013 | Kameda |
| 9,653,887 | B1 | 5/2017 | Niessner et al. |
| 9,979,162 | B2 | 5/2018 | Kasahara et al. |
| 2008/0092839 | A1 | 4/2008 | Hanashi et al. |
| 2008/0314354 | A1 | 12/2008 | Yorita et al. |
| 2015/0188292 | A1 | 7/2015 | Strong et al. |
| 2018/0294625 | A1 | 10/2018 | Niessner et al. |
| 2018/0294626 | A1 | 10/2018 | Niessner et al. |
| 2020/0176955 | A1 | 6/2020 | Niessner et al. |

(Continued)

FOREIGN PATENT DOCUMENTS

| | | | |
|---|---|---|---|
| CN | 108708812 | A | 10/2018 |
| EP | 3068001 | A1 | 9/2016 |
| EP | 3460929 | A1 | 3/2019 |

(Continued)

OTHER PUBLICATIONS

PCT International Search Report and Written Opinion; Application No. PCT/AT2019/060344; dated Jun. 25, 2020; 9 pages.

(Continued)

*Primary Examiner* — Christopher M Raabe
(74) *Attorney, Agent, or Firm* — Fletcher Yoder, P.C.

(57) ABSTRACT

Spark plug for igniting a combustible fuel in an internal combustion engine, wherein the spark plug has an igniter arranged at an end of the spark plug facing the combustion chamber, when the spark plug is mounted in the internal combustion engine. The spark plug includes a wall and a sealing area. The wall at least partially surrounds the igniter. The sealing area is used for sealing the combustion chamber against the environment. The wall has the sealing area located at an end of the wall, which end faces the combustion chamber when the spark plug is mounted in the internal combustion engine.

20 Claims, 5 Drawing Sheets

(56) References Cited

U.S. PATENT DOCUMENTS

2023/0246425 A1 * 8/2023 Klausner ................. H01T 21/02
445/7

FOREIGN PATENT DOCUMENTS

| | | | |
|---|---|---|---|
| GB | 539552 | A | 9/1941 |
| JP | 2004169671 | A | 6/2004 |
| JP | 2006059588 | A | 3/2006 |
| JP | 2012129042 | A | 7/2012 |
| JP | 2017059364 | A | 3/2017 |
| JP | 2017220363 | A | 12/2017 |
| JP | 2018164339 | A | 10/2018 |

OTHER PUBLICATIONS

Canadian Office Action for CA Application No. 3,153,780 dated Mar. 17, 2023; 5 pages.
Chinese Office Action for CN Application No. 201980101379.6 dated May 16, 2023; 10 pgs.
Japanese Office Action for JP Application No. 2022-519818 dated Feb. 8, 2023; 3 pgs.

* cited by examiner

SPARK PLUG AND METHOD FOR PRODUCING A SPARK PLUG

CROSS-REFERENCE TO RELATED APPLICATION

This application is a Continuation of U.S. application Ser. No. 17/639,337, filed Mar. 1, 2022, entitled "SPARK PLUG AND METHOD FOR PRODUCING A SPARK PLUG", which is a National Stage entry from and claims benefit of, PCT Application No. PCT/AT2019/060344, filed on Oct. 15, 2019; entitled "SPARK PLUG AND METHOD FOR PRODUCING A SPARK PLUG", which are herein incorporated by reference in its entirety.

BACKGROUND

The present invention concerns a spark plug for igniting a combustible fuel in an internal combustion engine.

Spark plugs are mounted on a cylinder head or a spark plug sleeve of an internal combustion engine, in a manner that an ignition means is arranged at an end of the spark plug facing the combustion chamber, by screwing a male screw portion (or external thread) of a spark plug body, which at least partially surrounds the ignition means, into the female screw portion on the cylinder head or the spark plug sleeve.

For sealing the combustion chamber against the environment (i.e., the space outside the combustion chamber at atmospheric pressure), spark plugs as known from the state of the art comprise gaskets. These gaskets are provided as sealing washers, which are placed between spark plug and the cylinder head (or the spark plug sleeve) at a sealing area of the spark plug. The sealing area is placed at a portion of the spark plug between the external thread and an insulator, so that the external thread is arranged between the sealing area and the combustion chamber.

The sealing washer is plastically or elastically deformed when mounting the spark plug at the cylinder head or the spark plug sleeve. Therefore, the spark plug is pre-loaded against the sealing portion of the cylinder head or the spark plug sleeve by screwing the spark plug into the appropriate female screw portion. When the spark plug is tightened and fixed to the screw portion on the side of the cylinder head or the spark plug sleeve, the gasket is loaded and thus deformed in order to secure a predetermined sealing performance.

Such embodiments of the state of the have been disclosed for example in EP 2 709 219 B1 or in EP 2 050 171 B1.

Spark plugs are known in various embodiments from the state of the art. Due do the efforts of improved life time requirements, the requirements regarding gas tightness and temperature management, i.e., enabling proper heat transfer between the spark plugs on the one hand and the cylinder head or the spark plug sleeves on the other hand, became more important.

Spark plugs are affected by large temperature conditions because at least one part of a spark plug is directly in contact with the combustion chamber and therefore with the combustion process. Heat is transferred to the spark plug from the combustion in the combustion chamber, which heat is dissipated over the external thread to the cylinder head or spark plug sleeve. Therefore, it is important to have a certain thermal conductivity between the external thread and the cylinder head or spark plug sleeve.

During the lifetime of the spark plug, deposits of the combustion are formed along the external thread of the spark plug body, between the spark plug and the cylinder head or spark plug sleeve. These deposits stem from the combustion process (primarily soot) and lead to a reduction of the thermal conductivity between the spark plug and the cylinder head or spark plug sleeve.

Therefore—on the one hand—a problem of spark plugs known from the state of the art is the decrease of heat transfer between the spark plug body and the cylinder head or the spark plug sleeve during the lifetime due to combustion deposits (e.g., soot) in the area of the threads.

On the other hand, a problem is the per se reduced heat transfer between the male thread of the spark plug body and the corresponding female thread in the cylinder head or the spark plug sleeve due to most likely inaccurate contact between the thread flanks.

Further embodiments known by the prior art are disclosed by the EP 3 460 929 A1, the JP 2006 059 588 A, the U.S. Pat. No. 1,840,528 A or the GB 539 552 A.

BRIEF DESCRIPTION

The disclosed embodiments help to prevent at least one of the mentioned disadvantages. A disclosed embodiments also may provide a spark plug and a method for producing a spark plug and a usage of a spark plug, wherein the lifetime of the spark plug is improved.

This is being achieved by a spark plug for igniting a combustible fuel in an internal combustion engine with the features described and claimed below. Protection is additionally sought for a usage of an improved sealing area and a method for producing a spark plug with an improved sealing area. Some advantageous embodiments of the invention are defined in the dependent claims.

In certain embodiments, it is provided that the wall has the sealing area located at an end of the wall, which end faces the combustion chamber when the spark plug is mounted in the internal combustion engine, which wall at least partially surrounds the ignition means, wherein the ignition means is arranged at an end of the spark plug facing the combustion chamber, when the spark plug is mounted in the internal combustion engine, wherein the sealing area is designed as a chamfer, and the sealing area designed as chamfer extends at least partially onto the ground electrode carrier.

On the one hand, using the wall as sealing area at an end of the spark plug facing the combustion chamber, a thermal conductivity section, which may for example be provided by an external thread of the spark plug, can be kept clean of deposits of the combustion (e.g., soot), which directly affect the thermal conductivity. On the other hand, sealing with a wall in said area leads to increased effective contact area between the spark plug body (preferably, e.g., at least partly together with the ground electrode carrier) and thus enhances the thermal conductivity or the heat transfer, respectively. Altogether, the lifetime of a spark plug can be increased significantly.

The combustible fuel can for example be present as an air fuel mixture and/or a gaseous fuel.

The wall can be formed as the spark plug body or as a separate element.

The term "end of the spark plug facing the combustion chamber" does not necessarily mean that this is the utmost terminus of the spark plug. It is, for example, quite conceivable that certain components of the spark plug protrude beyond the wall into the combustion chamber (e.g., the middle electrode of the spark plug). Therefore, the "end of the spark plug facing the combustion chamber" may refer to that side of the spark plug facing the combustion chamber when mounted.

The spark plug usually contains an ignition means, which could for example comprise at least one middle electrode and at least one ground electrode, wherein there is a spark gap between the at least one middle electrode and the least one ground electrode. In certain embodiments, the ignition means comprise a laser ignition or other forms of ignition.

It is provided that the sealing area is designed as a chamfer.

It can be provided that the sealing area is a terminal portion of the wall, which terminal portion faces the combustion chamber, when the spark plug is mounted in the internal combustion engine.

The end or terminal portion of the wall can be the end or terminal portion of the spark plug as a whole.

For the purposes of this document, the end of the wall means that it must be within 30%, 20% or 10% from the end of the wall in relation to the whole length of the spark plug. The terminal portion is to be understood as the very end of the wall facing the combustion chamber in the mounted state.

It can be provided that an electrical connection is arranged at an upper end of the spark plug for connecting the spark plug with an electrical power supply.

The at least one ground electrode is preferably connected to the ground electrode carrier by laser beam welding.

It is provided that the sealing area designed as chamfer extends at least partially onto the at least one ground electrode.

It can be provided that the sealing area designed as chamfer is at an angle between 20° and 50°, preferably at an angle between 27° and 41°, particularly preferred at an angle of 34°, with respect to a perpendicular of a center axis of the spark plug.

It can be provided that the spark plug body comprises a mounting portion for mounting the spark plug in the internal combustion engine and/or in a cylinder head and/or in a spark plug sleeve. It can be provided that the mounting portion is configured to pre-load the chamfer and/or the sealing area against a surface of a cylinder head or a spark plug sleeve. Therefore, it can be provided that the mounting portion comprises at least a partial external thread.

For all embodiments of the spark plug, it can be provided that between the sealing area in the area of the front end of the spark plug and the spark plug sleeve, an additional sealing means, preferably a sealing ring, is arranged. Such a sealing ring could be made out of copper or a copper alloy or any other material.

It can be provided that at least one middle electrode is connected at a centrally arranged middle electrode carrier, preferably connected to the middle electrode carrier by laser beam welding.

It can be provided that an isolator is arranged between the middle electrode carrier and the ground electrode carrier.

It can be provided that the at least one ground electrode is designed as a ring electrode, wherein the ring electrode surrounds a middle electrode of circular shape at least partially, wherein an annular spark gap is formed between the ground electrode and the middle electrode.

Protection is also sought for a spark plug sleeve for receiving a spark plug according to the invention.

Regarding a method for producing a spark plug, it can be provided that an ignition means is provided at an end of the spark plug facing the combustion chamber, when the spark plug is mounted in the internal combustion engine, a spark plug body is provided, which at least partially surrounds the ignition means and a sealing area, which is used for sealing the combustion chamber against the environment, and it is provided that the sealing area is formed at an end of the wall facing the combustion chamber, when the spark plug is mounted in the internal combustion engine, preferably by a machining process.

Preferably the ground electrode carrier is arranged in the terminal portion at an end of the wall facing the combustion chamber, wherein the ground electrode carrier is welded together with the wall, wherein the power of the welding means, preferably a laser welding apparatus, is sufficient to create a weld seam penetrating into the end face of the wall of the spark plug facing the combustion chamber, such that the ground electrode carrier is still joined with the wall through the weld seam after manufacturing a chamfer (wherein the chamfer is used as sealing area for sealing the combustion chamber against the environment).

The middle electrode and/or the ground electrode can comprise or consist of a precious metal.

BRIEF DESCRIPTION OF THE DRAWINGS

Further details and advantages of the invention are apparent from the accompanying figures and the following description of the drawings. The figures show.

DETAILED DESCRIPTION

Figure 1A:
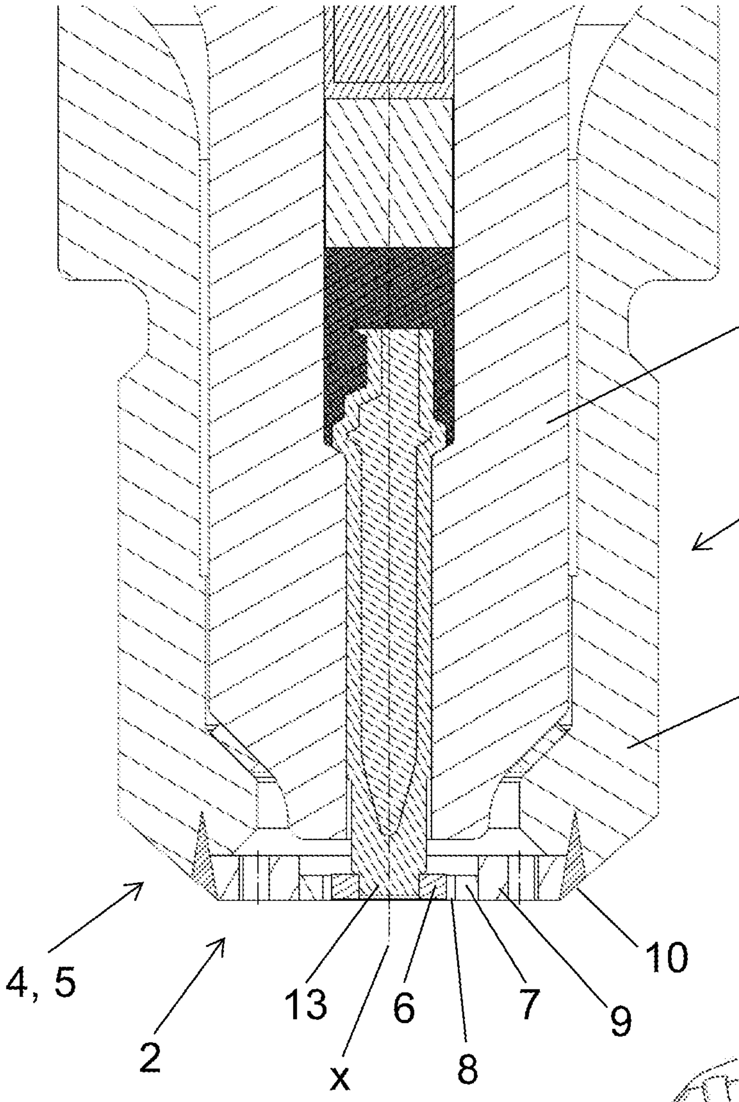
FIG. 1*a* illustrates an first embodiment of a spark plug according to the invention.

FIG. 1*a* shows a first embodiment of a spark plug 1 according to the invention, wherein an end of the spark plug 1 facing the combustion chamber, when the spark plug 1 is mounted in the internal combustion engine, is shown in more detail.

The spark plug 1 comprises an igniter or ignition means 2 having a middle electrode 6 and a ground electrode 7, wherein there is a spark gap 8 between the middle electrode 6 and the ground electrode 7.

The ground electrode 7 is arranged on the ground electrode carrier 9. In this specific embodiment the wall 3, which surrounds the ignition means 4, is formed as part of the spark plug body.

The spark plug body (e.g., wall 3) surrounds the ground electrode carrier 9, and the at least one ground electrode 7 is connected to the ground electrode carrier 9, e.g., by laser beam welding.

A weldseam 10 may be part of a chamfer 5. In such embodiments, the weldseam 10 may be deep enough, so that the ground electrode carrier 9 is appropriately fixed by the weldseam 10.

The manufacturing process can comprise a step, in which a groove for a weldseam 10 is manufactured, in a depth, such that at least one part of the weldseam 10 acts as a connection between the ground electrode carrier 9 and the spark plug body (e.g., wall 3), even after the manufacturing of the chamfer 5.

The middle electrode 6 is also connected to the middle electrode carrier 13 by laser beam welding.

Between the middle electrode carrier 13 and the ground electrode carrier 9, an isolator 14 is arranged.

For sealing the combustion chamber against the environment, the spark plug 1 comprises a sealing area 4, which is designed as the chamfer 5. This chamfer 5 is placed at the wall 3 (which is formed by the spark plug body in this embodiment). How the chamfer 5 acts as a sealing in area is described in connection with FIG. 3 below.

The spark plug body (e.g., wall 3) further comprises a mounting portion 11, for mounting the spark plug 1 in an internal combustion engine and/or in a cylinder head and/or in a spark plug sleeve. The mounting portion 11 is provided in this embodiment as (external) thread 12.

Figure 1B:
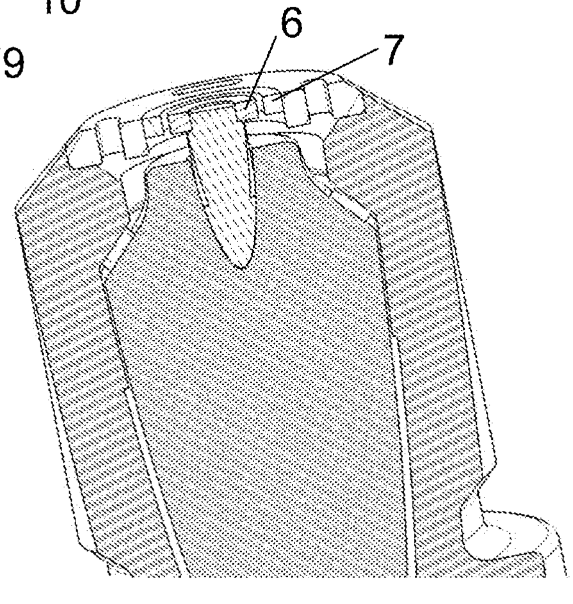
FIG. 1*b* illustrates an isometric view of an embodiment similar to FIG. 1*a,*

FIG. 1*b* shows an isometric view of a second embodiment similar to the embodiment of FIG. 1*a*. The only difference is that the weldseam 10 is not present in FIG. 1*b*.

It can be seen in FIG. 1*a* that the ground electrode 7 is designed as a ring electrode, wherein the ring electrode surrounds a circular formed middle electrode 6, wherein an annular spark gap 8 is formed between the ground electrode 7 and the middle electrode 6.

Further, in this embodiment of FIG. 1*a*, the chamfer 5 extents to the ground electrode carrier 9, with the advantage of an enhanced heat transfer between the spark plug body 3 and the spark plug sleeve as well as between the ground electrode carrier 9 and the spark plug sleeve.

Figure 2A:
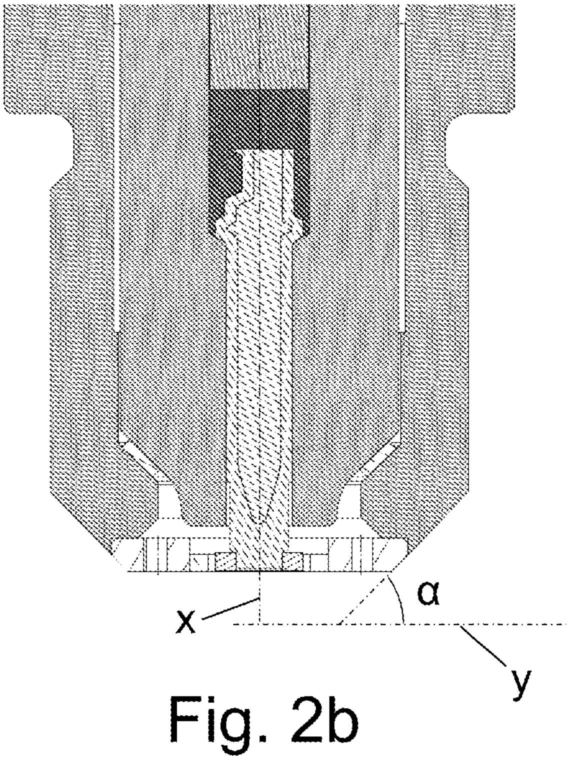
FIGS. 2*a*, 2*b* illustrate third and fourth embodiments of a spark plug according to the invention.
Figure 2B:
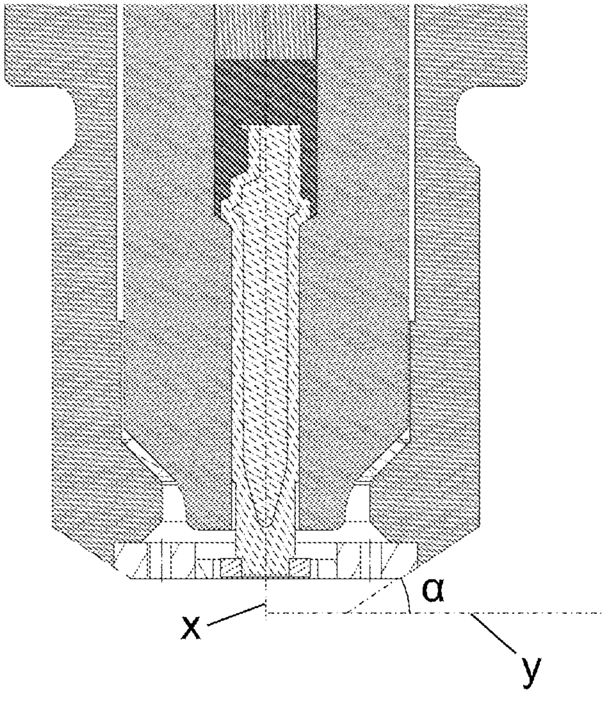

The sealing area 4 in the form of the chamfer 5 is designed with an angle α with respect to a perpendicular y of a center axis x of the spark plug 1. This can be seen in more detail in FIGS. 2*a* and 2*b*. FIG. 2*a* shows an embodiment of a spark plug 1 according to the invention with a chamfer 5 at angle α of 41° and FIG. 2*b* an embodiment with a chamfer 5 at angle α of 27° with respect to the perpendicular y of a center axis x of the spark plug 1.

The spark plug 1 can be substantially symmetric with respect to the center axis x.

Figure 3:
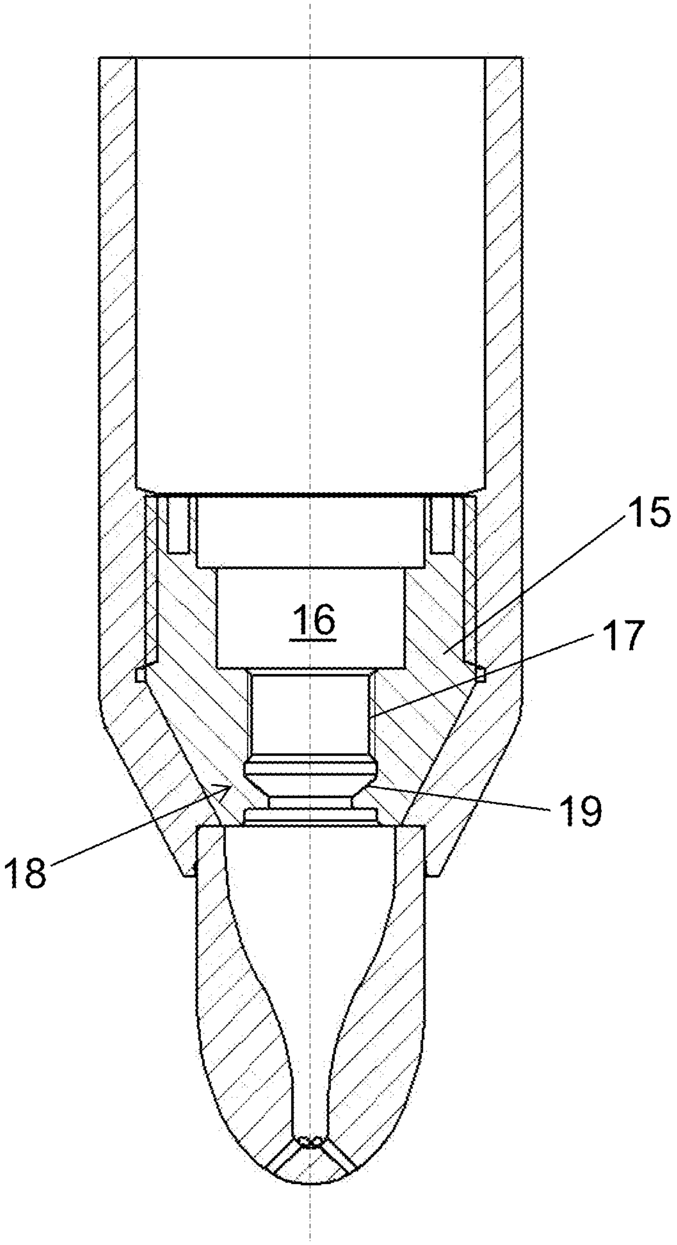
FIG. 3 illustrates a spark plug sleeve for receiving a spark plug according to the invention.

FIG. 3 shows a spark plug sleeve 15 for receiving a spark plug 1 according to the invention (and shown in FIG. 1*a*). Therefore, the spark plug sleeve 15 comprises a screw portion 16, having an internal thread 17 and a sealing portion 18. The sealing portion 18 is accordingly designed as a further chamfer 19 of the spark plug sleeve 15, which forms the counterpart to the chamfer 5 of the spark plug 1.

Figure 4:
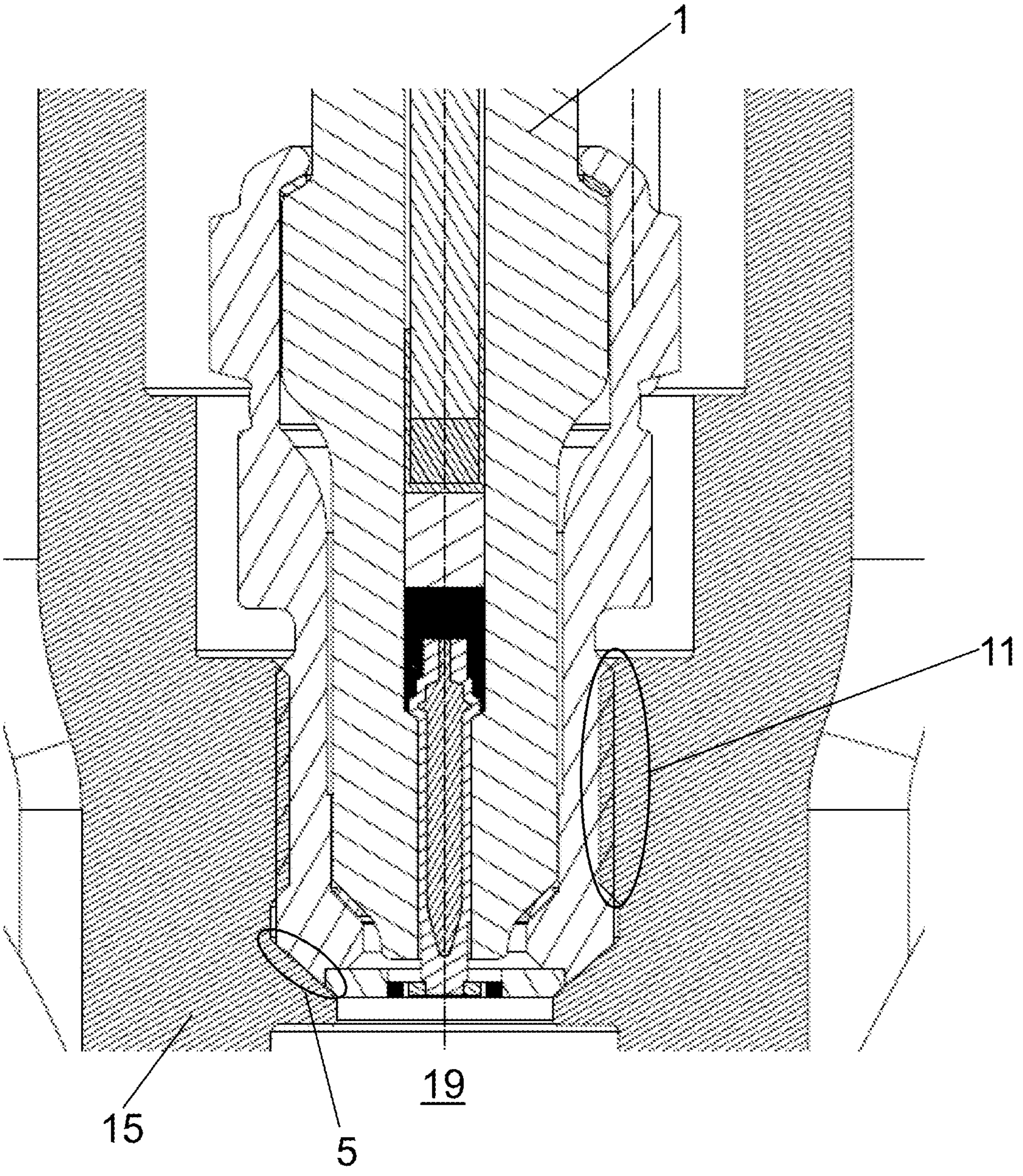
FIG. 4 illustrates a spark plug mounted in the spark plug sleeve and FIG. 5 illustrates a further embodiment of a spark plug.

FIG. 4 shows the spark plug 1 (from FIG. 1*a*) mounted in the spark plug sleeve 15 (from FIG. 3). It can be seen that a pre-load device (which is provided by the external thread 12 in conjunction with the internal thread 17) is configured to pre-load the chamfer 5 of the spark plug 1 against a surface of the spark plug sleeve 15 (in particular against the further chamfer 19 of the spark plug sleeve 15).

Figure 5:
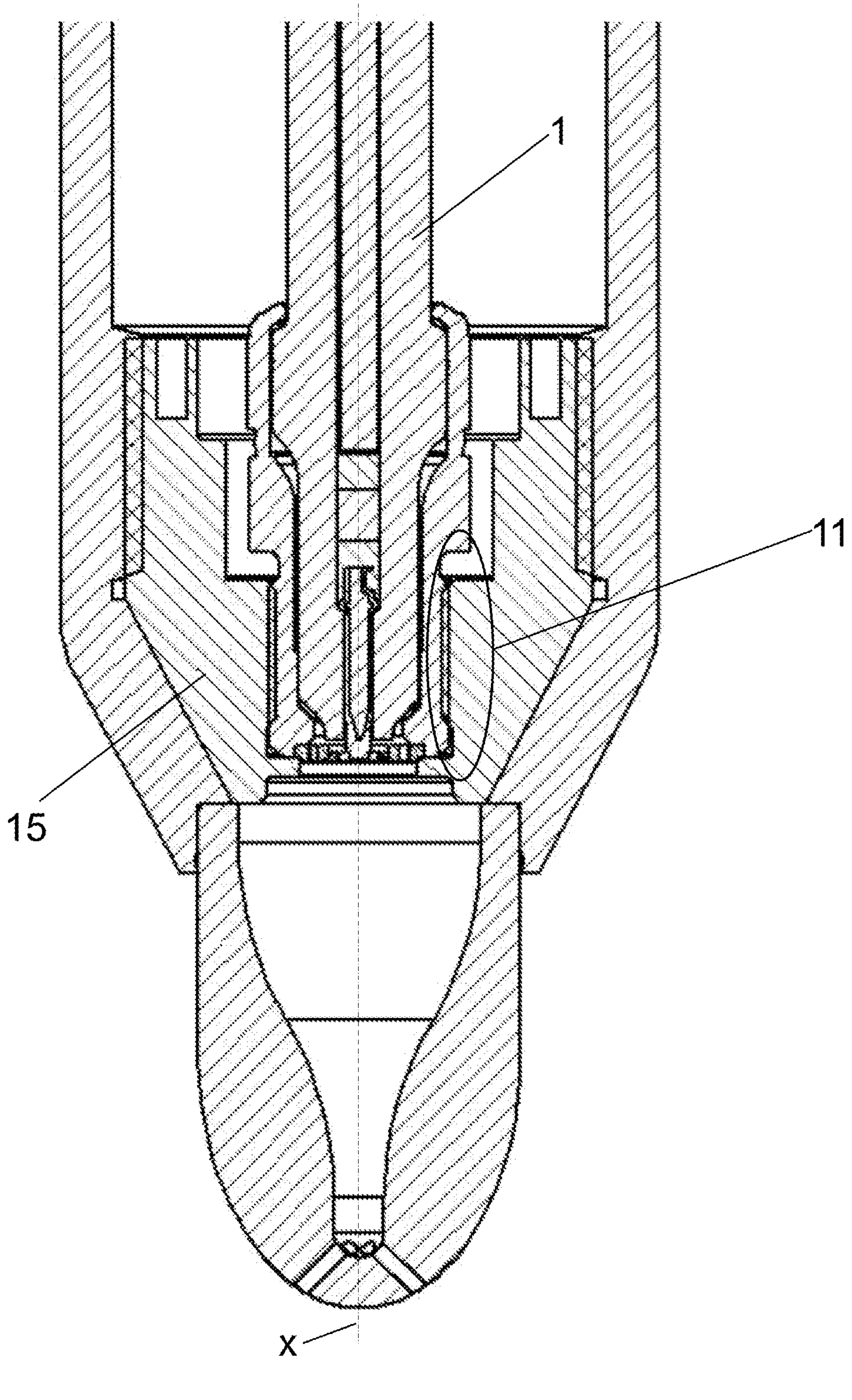

FIG. 5 shows the further embodiment of a spark plug 1 according to the invention mounted in the spark plug sleeve 15 (from FIG. 3). It can be seen that a pre-load device (which is provided by the external thread 12 in conjunction with the internal thread 17) is configured to pre-load the sealing area of the spark plug 1 against a surface of the spark plug sleeve 15. This embodiment of a spark plug 1 comprises a sealing area, which extends rectangular from the center axis x. This sealing area interacts with a corresponding inner surface of the spark plug sleeve 15.

Embodiments with interchanged external/male and internal/female threads are conceivable.

REFERENCE SIGNS

1. spark plug
2. ignition means
3. wall
4. scaling area
5. chamfer
6. middle electrode
7. ground electrode
8. spark gap
9. ground electrode carrier
10. weldseam
11. mounting portion
12. external thread
13. middle electrode carrier
14. isolator
15. spark plug sleeve
16. screw portion (spark plug hole)
17. internal thread
18. scaling portion
19. further chamfer
α angle
x center axis
y perpendicular of center axis

The invention claimed is:

1. An apparatus, comprising:

a spark plug configured to ignite a combustible fuel in an internal combustion engine, wherein the spark plug comprises:

an igniter arranged at an end of the spark plug and configured to face the combustion chamber, when the spark plug is mounted in the internal combustion engine, wherein the igniter comprises a first electrode and a spark gap, wherein the first electrode is arranged on a first electrode carrier, a wall at least partially surrounding the igniter, and a sealing area configured to seal the combustion chamber against the environment, wherein the wall comprises the sealing area having a chamfer, and the sealing area comprising the chamfer extends at least partially onto the first electrode carrier.

2. The apparatus of claim 1, comprising a cylinder head, a combustion engine, or a combination thereof, having the spark plug.

3. The apparatus of claim 1, wherein the sealing area is a terminal portion of the wall, wherein the terminal portion is configured to face the combustion chamber when the spark plug is mounted in the internal combustion engine.

4. The apparatus of claim 1, wherein the first electrode comprises a ground electrode and the first electrode carrier comprises a ground electrode carrier.

5. The apparatus of claim 1, wherein the sealing area is at an end of the wall.

6. The apparatus of claim 1, wherein the first electrode is connected to the first electrode carrier by a weldseam.

7. The apparatus of claim 1, wherein the sealing area comprising the chamfer extends at least partially onto the first electrode.

8. The apparatus of claim 1, wherein the sealing area comprising the chamfer is at an angle (α) between 20° and 50° with respect to a perpendicular (y) of a center axis (x) of the spark plug.

9. The apparatus of claim 1, wherein the wall comprises a mounting portion configured to mount the spark plug in the internal combustion engine and/or in a cylinder head and/or in a spark plug sleeve, wherein the mounting portion comprises at least a partial external thread.

10. The apparatus of claim 1, wherein the spark plug comprises a second electrode, and the spark gap is between the first and second electrodes.

11. The apparatus of claim 1, comprising a second electrode carrier having the second electrode.

12. The apparatus of claim 11, comprising an isolator arranged between the first electrode carrier and the second electrode carrier.

13. The apparatus of claim 1, wherein the first electrode comprises a ring electrode.

14. The apparatus of claim 13, wherein the spark gap comprises an annular spark gap between the ring electrode and a second electrode.

15. The apparatus of claim 1, comprising a weldseam between the wall and the first electrode carrier, wherein the sealing area comprising the chamfer extends at least partially onto the weldseam.

16. The apparatus of claim 1, comprising a spark plug sleeve configured to receive the spark plug, wherein the spark plug sleeve comprises a screw portion having an internal thread and a sealing portion, wherein the sealing portion comprises a further chamfer of the spark plug sleeve, which forms a counterpart to the chamfer of the spark plug.

17. The apparatus of claim 8, wherein the angle (α) is between 27° and 41°.

18. A method for producing a spark plug, wherein providing an igniter at an end of the spark plug configured to face a combustion chamber when the spark plug is mounted in an internal combustion engine, wherein the igniter comprises a first electrode and a spark gap, wherein the first electrode is arranged on a first electrode carrier, providing a wall of the spark plug at least partially surrounding the igniter, and providing a sealing area of the spark plug configured to seal the combustion chamber against the environment, wherein the sealing area comprises a chamfer, wherein the sealing area comprising the chamfer extends at least partially onto the first electrode carrier.

19. The method of claim 18, comprising a weldseam between the wall and the first electrode carrier, wherein the sealing area comprising the chamfer extends at least partially onto the weldseam.

20. A system, comprising:

at least part of an internal combustion engine having a spark plug receptacle; and a spark plug disposed in the spark plug receptacle, wherein the spark plug comprises:

an igniter having a spark gap and a first electrode arranged on a first electrode carrier;

a wall at least partially surrounding the igniter; and a sealing area on the wall, wherein the sealing area comprises a chamfer extending at least partially onto the first electrode carrier.

* * * * *